April 8, 1924.
J. P. CROWLEY
DRAWING CONTINUOUS SHEET GLASS
Filed June 6, 1921
1,489,823
2 Sheets-Sheet 1
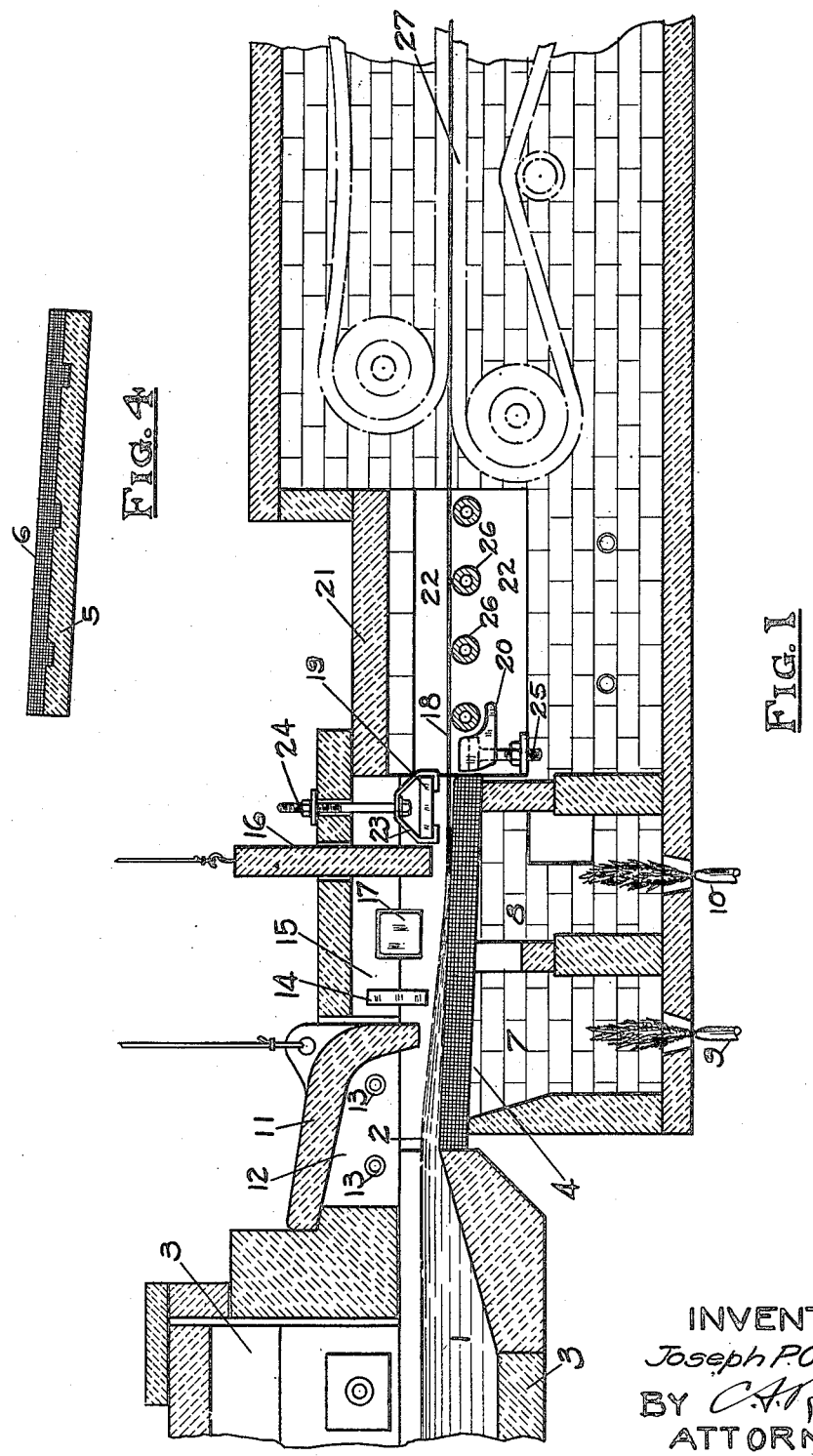
INVENTOR
Joseph P. Crowley
BY C. A. Rowley
ATTORNEY

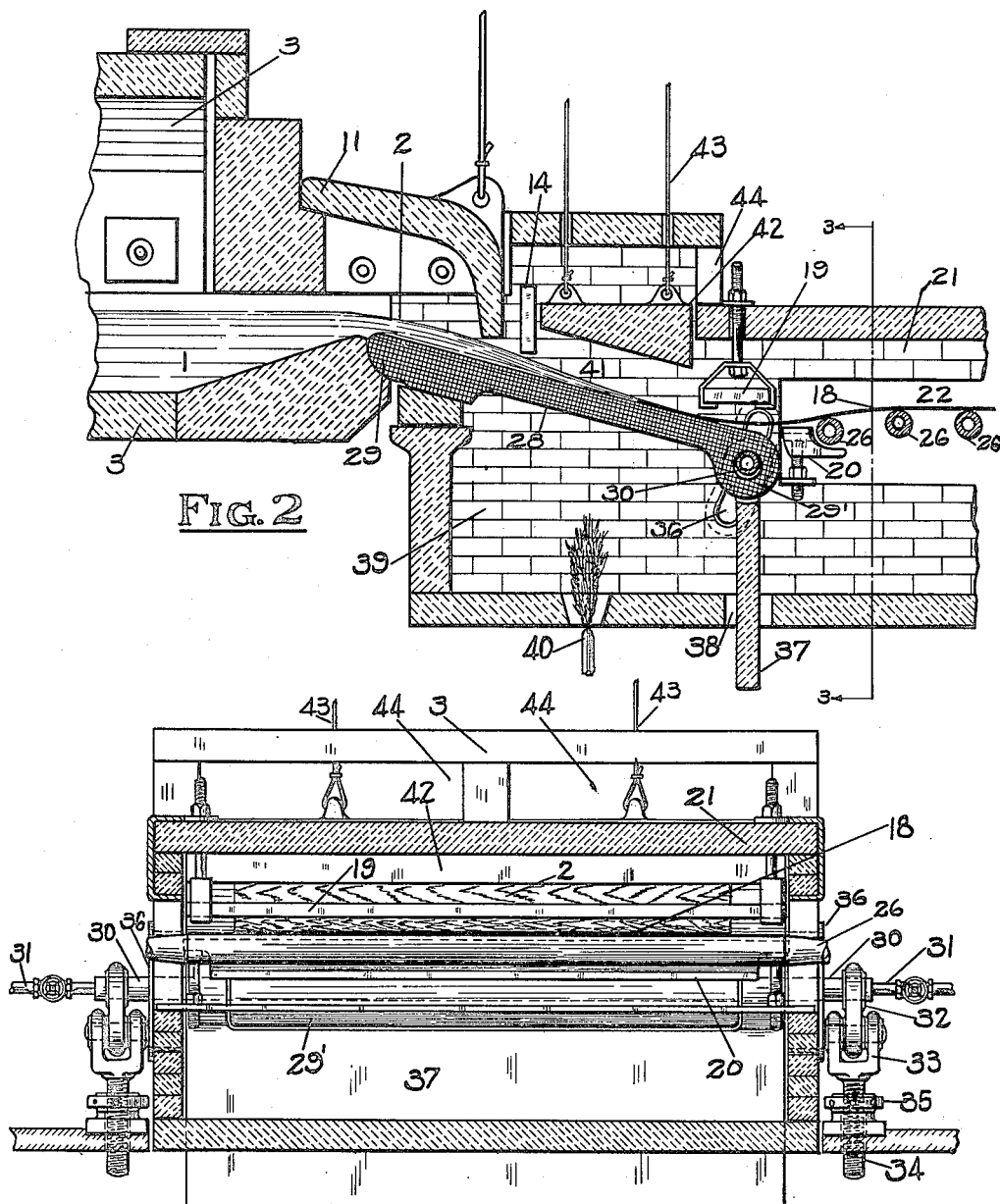

Patented Apr. 8, 1924.

1,489,823

UNITED STATES PATENT OFFICE.

JOSEPH P. CROWLEY, OF TOLEDO, OHIO, ASSIGNOR TO THE LIBBEY-OWENS SHEET GLASS COMPANY, OF TOLEDO, OHIO, A CORPORATION OF OHIO.

DRAWING CONTINUOUS SHEET GLASS.

Application filed June 6, 1921. Serial No. 475,291.

*To all whom it may concern:*

Be it known that I, JOSEPH P. CROWLEY, a citizen of the United States, residing at Toledo, in the county of Lucas and State of Ohio, have invented new and useful Improvements in Drawing Continuous Sheet Glass, of which the following is a specification.

This invention relates to a new process and apparatus for drawing sheet glass, and is more particularly, an improvement in the process of drawing sheet glass horizontally from a source of molten glass.

In processes heretofore known, the sheet has been drawn horizontally from an overflow lip, or from the end of a horizontal or inclined slab, onto which the glass flows in a molten stream, and the transition from the molten to the solid form takes place at the edge of the lip or slab, or after the plastic glass has been drawn therefrom. The difficulties encountered with all such systems, are largely due to the fact that the excess of molten glass overflows down the edge of the drawing lip, eventually devitrifying at this point, and forming accumulations of "dog-metal," which cause lines and other defects in the sheet.

In this present improved system, the molten glass flows out from the source onto a slab of graphite or similar material which will not adhere to or injure the hot glass, and the glass is cooled and stretched or attenuated into sheet form while still remaining on the slab, so that before leaving the surface of the slab it has assumed a practically solid sheet form, although still semi-plastic, and capable of being stretched through a combined drawing and flattening apparatus, such as now used in the well-known Colburn process of drawing sheet-glass.

The invention will be more clearly understood from the following detailed description of two examples of apparatus well adapted to carry out the principles of the invention.

In the accompanying drawings:

Fig. 1 is a longitudinal vertical section through one form of the apparatus.

Fig. 2 is a similar view of a modified construction.

Fig. 3 is a vertical transverse section, taken substantially on the line 3—3 of Fig. 2.

Fig. 4 is a section through a modified form of slab.

Referring first to Fig. 1, the molten glass 1, flows out at 2, from the end of the refining chamber 3 of a continuous tank furnace, or other suitable source of supply, onto the slab 4, which is preferably mounted in the slightly inclined position indicated in Fig. 1. This slab is composed of graphite or some suitable composition to which the molten glass will not adhere, and on which the solidifying semi-plastic sheet may be drawn and stretched without being injured thereby. Such slabs can be constructed of so-called graphite-clay, a mixture of clay and graphite in proportions which are varied according to the conditions under which the material is used. The clay gives strength and stability to the slab, while the graphite forms a smooth, non-scratching surface, to which the glass does not adhere.

If desired, the slab may be constructed as shown in Fig. 4, of a lower section 5 of clay or other refractory material, and a surface layer 6 of graphite, or graphite-clay containing a higher percentage of graphite.

Below the slab 4, are suitable heating chambers 7 and 8, for maintaining the slab at the required drawing temperature. Burners such as 9 and 10 supply heat for these chambers.

Over the tank or inlet end of the slab 4, is a lip-tile 11, enclosing a heating chamber 12, with burners 13, for maintaining the heat of the molten glass 2 as it flows out onto the slab. Beyond the lip-tile 11, a cooler 14 (preferably of the type through which water flows continuously), is located in a cooling chamber 15. The temperature of this chamber may be regulated by raising or lowering the shear-cake 16, or by removing the plugs 17 in the side-walls, whereby the cooling air from without is allowed to enter.

From the chamber 15, the glass sheet 18 is drawn out between coolers 19 and 20, and through the arched cooling chamber 21, which is open to the air at its sides 22. Cooler 19 is carried by yokes 23, adjustable vertically by the screws 24, while cooler 20 is adjusted vertically by the screws 25 adjacent its ends. While passing through chamber 21, the sheet is carried by the supporting rolls 26. The sheet then passes into the drawing and flattening mechanism 27, which may be of any suitable type, but is shown of the form now used in the Colburn process, as disclosed for example in the patent to I. W. Colburn, 1,274,385, granted August 6, 1918.

In operation, when the flowing stream of glass 2, passes out from under lip-tile 11, into cooling chamber 15, it is stiffened by the cooler 14, into a semi-plastic or viscous condition, and from this mass the glass sheet 18 is stretched out by the drawing mechanism 27. Obviously the drawing mechanism 27 must be operated at such a speed that the glass will be drawn from the slab faster than it flows thereon, and thus stretched or attenuated into sheet form as shown in the drawings. As the stream of molten glass assumes sheet form, and becomes partially set, it ceases to flow along the slab but slides thereon, so that before the outer end of the slab is reached, the glass is sliding on the graphite surface in sheet form. In this way there is no accumulation of molten glass to form dog-metal at the end of the slab, and hence no lines or other defects will be drawn into the glass sheet. The sheet leaves the surface of the slab near the end thereof, passing off between the coolers 19 and 20, which help to set the sheet in its final form, this setting process being also accelerated by the cooling air passing through the open chamber 22.

In the form of apparatus shown in Figs. 2 and 3, provision is made to vary the inclination of the drawing slab 28 to control the rate of flow. As in the form previously described, the molten glass 1 flows out at 2 from refining tank 3, passing under lip-tile 11, onto the slab 28. As before the glass flows under the cooler 14, where it is reduced to a viscous state, and is then drawn off as a sheet between coolers 19 and 20, and over supporting rolls 26 in cooling chamber 21, open at its sides 22.

In this form of apparatus the slab 28 is so formed at its inner end 29 that it can pivot at the outlet of the tank 3; and the outer end 29' of the slab is carried by a cooled cross-shaft 30, through which cooling fluid may be passed through pipe connections 31. At each end the shaft 30 is carried by a link 32, mounted in a yoke 33, at the upper end of a screw 34, supported in an adjusting nut 35. The shaft 30 is guided up and down in the arcuate slotted guides 36. By suitably adjusting the nuts 35, the outer end of the slab 28 may be raised or lowered, thus varying the inclination of the slab, and hence the rate of flow of the molten glass, and the resistance to the drawing operation.

A block of refractory material 37 is suspended from the shaft 30, its lower end passing freely through a slot 38 in the bottom wall. This block forms the front wall of heating chamber 39 beneath the slab 28, this chamber being heated by suitable burners such as 40.

In this case, the temperature in the cooling and drawing chamber 41, above the slab is regulated by raising or lowering the block of refractory material 42, suspended by cables 43 from any suitable adjusting means, not illustrated. This will vary the effective volume of the chamber above the drawing point, and also expose the glass more or less to the action of coolers 14 and 19. The portion of chamber 41, above block 42 is open to the air as at 44.

It will now be understood, that this invention is a combined flowing and drawing system, the glass being supported throughout the transition period upon a slab of solid material which will not adhere to, or in any way mar the surface of the glass.

Throughout the following claims, it is to be understood that whenever "graphite" is mentioned, the term is intended to include such mixtures of graphite and clay, or other similar substances, as would give the results previously described.

Claims:

1. The method of forming sheet glass, consisting in flowing a stream of molten glass directly onto a heated slab, cooling the glass while on the slab, and drawing the glass across and from the slab faster than it flows thereon, so that it is attenuated and set in sheet form before it leaves the surface of the slab.

2. The method of forming sheet glass, consisting in flowing a stream of molten glass directly onto a graphite slab, cooling the glass while on the slab, and drawing the glass across and from the slab faster than it flows thereon, so that it is attenuated and set in sheet form before it leaves the surface of the slab.

3. The method of forming sheet glass, consisting in flowing molten glass from a source of supply, and then drawing away the flowing glass faster than it flows from the source so that it is attenuated into sheet form, the glass being supported during the transition period upon the flat face of a heated slab, and leaving the slab in sheet form before reaching the end of the slab.

4. The method of forming sheet glass, consisting in flowing molten glass from a source of supply, and then drawing away the flowing glass faster than it flows from the source so that it is attenuated into sheet form, the glass being supported during the transition period upon the flat face of a graphite slab, and leaving the slab in sheet form before reaching the end of the slab.

5. In an apparatus for drawing sheet glass, an inclined graphite slab, means adjacent the higher end of the slab for flowing molten glass thereon, and means for drawing the glass along and from the slab in sheet form before the glass has reached the lower end of the slab.

6. In an apparatus for drawing sheet glass, an inclined graphite slab, means for flowing molten glass onto the slab, and means for stretching the glass into sheet form while on the slab.

7. In an apparatus for drawing sheet glass, an inclined graphite slab, means adjacent the higher end of the slab for flowing molten glass thereon, means for cooling the glass while on the slab, and means for drawing the glass along and from the slab in sheet form before it has reached the lower end of the slab.

8. In an apparatus for drawing sheet glass, an inclined graphite slab, means for flowing molten glass onto the slab, means for cooling the glass while on the slab, and means for stretching the glass into sheet form while on the slab.

9. An apparatus for drawing sheet glass, comprising a tank containing molten glass, a drawing slab pivoted to the tank outlet so that the molten glass may flow out onto the slab, means for adjustably supporting the free end of the slab, and means for stretching the glass into sheet form while on the slab.

10. An apparatus for drawing sheet glass, comprising a tank containing molten glass, a graphite drawing slab pivoted to the tank outlet so that the molten glass may flow out onto the slab, means for adjustably supporting the free end of the slab, and means for stretching the glass into sheet form while on the slab.

11. An apparatus for drawing sheet glass, comprising a tank containing molten glass, a graphite drawing slab pivoted to the tank outlet so that the molten glass may flow out onto the slab, means for adjustably supporting the free end of the slab, means for cooling the glass while on the slab, and means for stretching the glass into sheet form while on the slab.

12. An apparatus for drawing sheet glass, comprising a tank containing molten glass, a drawing slab pivoted to the tank outlet so that the molten glass flows out onto the slab, a cooled supporting shaft for the free end of the slab, means for adjusting the shaft vertically to vary the inclination of the slab, means for cooling the glass while on the slab, and means for stretching the glass into sheet form while on the slab.

13. An apparatus for drawing sheet glass, comprising a tank containing molten glass, a graphite drawing slab pivoted to the tank outlet so that the molten glass flows out onto the slab, a cooled supporting shaft for the free end of the slab, means for adjusting the shaft vertically to vary the inclination of the slab, means for cooling the glass while on the slab, and means for stretching the glass into sheet form while on the slab.

14. An apparatus for drawing sheet glass, comprising a tank containing molten glass, a graphite drawing slab pivoted to the tank outlet so that the molten glass flows out onto the slab, a cooled supporting shaft for the free end of the slab, means for adjusting the shaft vertically to vary the inclination of the slab, a heating chamber beneath the slab, the front wall of the chamber being vertically adjustable with the slab, means for cooling the glass while on the slab, and means for stretching the glass into sheet form while on the slab.

Signed at Toledo, in the county of Lucas and State of Ohio, this 3d day of June, 1921.

JOSEPH P. CROWLEY.